May 2, 1939. L. C. HUFF Re. 21,066
CONVERSION OF HYDROCARBON OILS
Original Filed Jan. 2, 1931
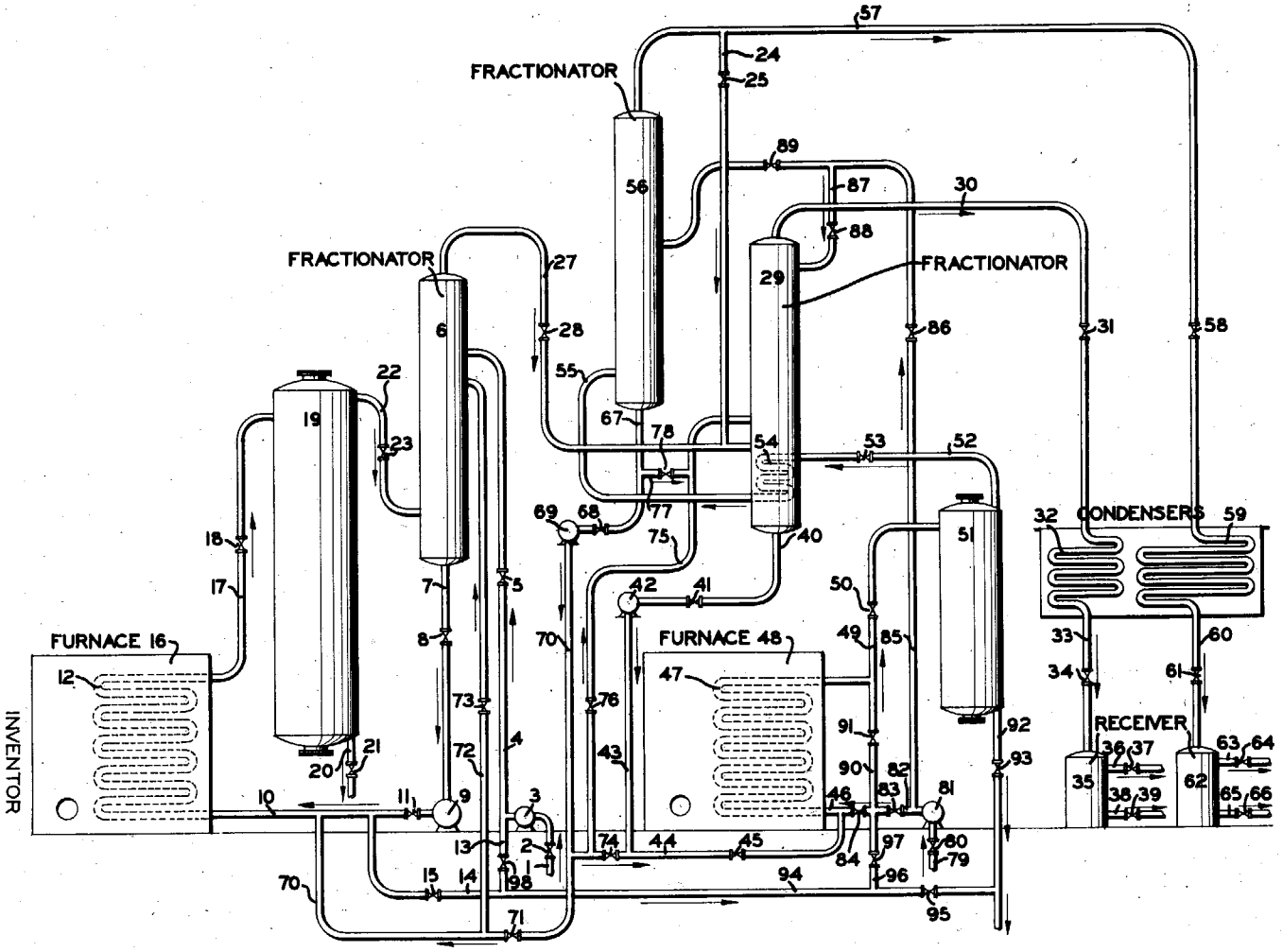
INVENTOR
LYMAN C. HUFF
BY Frank L. Belknap
ATTORNEY Reissued May 2, 1939

Re. 21,066

UNITED STATES PATENT OFFICE 21,066

CONVERSION OF HYDROCARBON OILS

Lyman C. Huff, Chicago, Ill., assignor, by mesne assignments, to Universal Oil Products Company, Chicago, Ill., a corporation of Delaware Original No. 2,064,834, dated December 22, 1936, Serial No. 506,136, January 2, 1931. Renewed March 4, 1936. Application for reissue August 18, 1937, Serial No. 159,731

4 Claims. (Cl. 196—48)

This invention relates to an improved process and apparatus for treating hydrocarbon oils, and refers more particularly to the conversion of relatively heavy oils into lighter and more valuable products.

The invention may comprise the employment of a primary cracking system wherein relatively mild conversion conditions may exist and through which oil may pass, and a secondary cracking system wherein more severe conversion conditions may be maintained. Raw oil charging stock may be supplied to a heating element of a primary cracking system, and reflux condensate from a fractionator of said system may be returned to said primary heating element for reconversion. Vapors from a fractionator of said primary cracking system may be subjected to further fractionation in a secondary fractionator of said system, and reflux condensate from said secondary fractionator may be supplied to a heating element within a secondary cracking system. Vapors from a reaction chamber of said secondary cracking system may be subjected to fractionation in a separate fractionator of said system, while reflux condensate from said system and fractionator may be returned for reconversion, either to the primary cracking system or to the secondary cracking system, or, in part, to both.

As a particular feature of the invention, a secondary charging stock, such, for example, as bottoms from the redistillation of a cracked distillate, the bottoms from a secondary tower of a separate cracking system, or other oil, preferably similar in characteristics to reflux condensate from a secondary fractionator of a primary cracking system, may be fed to a secondary cracking system for conversion, and supplied either overhead to a fractionator of said system, to a secondary fractionator of a primary cracking system directly into the inlet side of a secondary heating element, or into a stream of heated products being discharged from said secondary heating element, or partially to both.

As another feature of the invention, vapors from a reaction chamber of a secondary cracking system may be employed to reboil reflux condensate in a secondary fractionator of a primary cracking system, by passing said vapors into indirect contact therewith, prior to their introduction into a fractionator of the secondary cracking system.

As another feature of the invention, a portion of either the primary or secondary charging stock, or both, may be blended with the residual oil withdrawn from a reaction chamber of a secondary cracking system to improve the quality of the latter.

Other and further objects and advantages of the invention will become apparent from the following description and drawing, showing a diagrammatic, side-elevational view of one form of apparatus in which the invention may be carried out.

Referring to the drawing, raw oil charging stock may be supplied through a line 1, controlled by a valve 2, to a pump 3, from which it may pass through a line 4, controlled by a valve 5, to a primary fractionator 6, where it may assist in fractionating the vapors undergoing treatment therein, and being discharged from said fractionator, together with the relatively heavy, condensed components of said vapors, through a line 7, controlled by a valve 8, to a pump 9, from whence said oil and condensed components may be fed through a line 10, controlled by a valve 11, to a primary heating element 12. All or any desired portion of said raw oil may pass from pump 3 through a line 13, to a line 14, controlled by a valve 15, communicating with said line 10, and passing through said latter line directly to heating element 12.

Primary heating element 12 may be disposed in any suitable type of furnace 16, and the oil passing therethrough may be heated to any desired conversion temperature under any desired pressure, after which it may pass through a line 17, controlled by a valve 18, to a primary reaction chamber 19, wherein separation of vapors and unvaporized material may occur. In event the primary cracking system be operated for the production of a liquid residual product, said residue may be removed from chamber 19 through a line 20, controlled by a valve 21. Should non-residuum operations be employed, coke or carbonaceous materials may be allowed to accumulate in primary reaction chamber 19 and removed therefrom after operations are discontinued.

Vapors from chamber 19 may pass through line 22, controlled by a valve 23, to primary fractionator 6, wherein their relatively heavy, insufficiently converted components may be condensed and returned for reconversion in primary heating element 12, as already described. Vapors from said fractionator 6 may pass through a line 27, controlled by a valve 28, to a secondary fractionator 29, of the primary system, where they may be subjected to further fractionation for separation of the light components, preferably falling within the boiling range of motor fuel. The lighter components of said vapors may pass from said fractionator through a line 30, controlled by a valve 31, to a primary condenser 32 for condensation and cooling. Condensed distillate and incondensable gases may pass from said condenser 32, through a line 33, controlled by a valve 34, to a primary receiver 35. Incondensable gases may be released from said receiver through a line 36, controlled by a valve 37, while distillate may be removed from said receiver through a line 38, controlled by a valve 39.

Relatively heavy components of the vapors subjected to additional fractionation within secondary fractionator 29 of the primary system, may pass from said fractionator through a line 40, controlled by a valve 41, to a pump 42, from which they may be fed, via a line 43, into a line 44, controlled by a valve 45, and thence through a line 46 into a secondary heating element 47 of a secondary system. Secondary heating element 47 may be disposed within any conventional type of furnace 48, and oil passing therethrough may be subjected to any desired conversion conditions, preferably of a more severe order than that maintained in primary heating element 12. After subjection to the necessary conversion conditions within heating element 47, the heated products may be discharged from said element through a line 49, controlled by a valve 50, and passed into a secondary reaction chamber 51, of the secondary system. Vapors may be withdrawn from said secondary reaction chamber 51 through a line 52, controlled by a valve 53, and passed through a reboiler 54 suitably disposed within secondary fractionator 29, from which they may pass through a line 55, to a fractionator 56 of the secondary system. By providing a reboiler 54 within said secondary fractionator 29, the reflux condensate within said fractionator may be heated by indirect contact with the relatively hot vapors passing therethrough from said second secondary reaction chamber 51, effecting a substantial stripping of entrained desirable light products from said reflux before its subjection to reconversion in secondary heating element 47.

Lighter vapors may be removed from said fractionator 56 through a line 57, controlled by a valve 58, and may be passed to a condenser 59 of the secondary system, wherein they may be subjected to condensation and cooling, the condensed distillate and incondensable gases passing from said condenser through a line 60, controlled by a valve 61, to a secondary receiver 62. Incondensable gases may be released from receiver 62 through a line 63, controlled by a valve 64, and condensed distillate may be withdrawn from said receiver through a line 65, controlled by a valve 66. If desired, instead of passing to separate condensation, cooling and collecting, vapors from fractionator 56 may be diverted, wholly or partly, through a line 24, communicating with line 57, (line 24 being controlled by a valve 25), and passing through said line 24 into secondary fractionator 29 for further fractionation, together with the vapors from primary fractionator 6.

It will be understood, of course, that the usual expedients for controlling the outlet temperature of the vapors from various fractionators of the system, such as recirculating a portion of the final products from receiver 62 and/or receiver 35, may be adopted, although not shown in detail herein.

Reflux condensate from fractionator 56 of the secondary system, may be withdrawn through a line 67, controlled by a valve 68, and passed to a pump 69, from whence it may be passed through a line 70, controlled by a valve 71, and line 10, into primary heating element 12 for reconversion; or any desired portion of said reflux, instead of passing directly to heating element 12, may be introduced into primary fractionator 6 through a line 72, controlled by a valve 73, communicating with said line 70, and further assist in fractionation of the vapors undergoing treatment within said fractionator, after which it may pass, together with the heavier condensed portions of said vapors within fractionator 6 and raw oil charging stock to said primary heating element 12, through line 7, pump 9, and line 10, as previously described. Instead of being returned to said primary heating element 12, reflux condensate from said fractionator 56 may pass, either wholly or partly, from line 70, through which it may be discharged, into line 44 and through control valve 74 interposed in said line 44, and thence into line 46 to heating element 47 of the secondary system for reconversion at an elevated temperature; or, instead of passing to secondary heating element 47, said reflux may, if desired, pass from line 44 through a line 75, controlled by a valve 76, into secondary fractionator 29, combining therein with reflux condensate formed in said fractionator, and thence passing therewith through said line 40, pump 42, lines 43, 44 and 46 to heating element 47, as previously described. It will be understood, of course, that in event secondary fractionator 29 be operated at a lower pressure than that employed in fractionator 56, any desired portion of reflux condensate from fractionator 56 may pass directly therefrom to fractionator 29 through line 67 and thence through a line 77, controlled by a valve 78, and line 75, in which event pump 69 may be eliminated.

A secondary charging stock, preferably similar in characteristics to the reflux condensate from secondary fractionator 29, or, in event reflux condensate from fractionator 56 is also returned to secondary heating element 47, similar in characteristics to the combined reflux from both fractionators, may be supplied through a line 79, controlled by a valve 80, to a pump 81, from which it may be fed through a line 82, controlled by a valve 83, and a valve 84, and line 46, communicating with said line 82, directly to said secondary heating element 47; or through a line 85, controlled by a valve 86, and a line 87, controlled by a valve 88, to secondary fractionator 29; or through said line 85 and control valve 89 interposed in said line, to fractionator 56; or partially to either or all of said elements. A portion or all of said secondary charging stock may be fed through pump 81, line 82 and a line 90, controlled by a valve 91, into line 49 through which the reconverted products may discharge from heating element 47, to contact directly and commingle with said stream of heated products, serving to cool said stream to any desired temperature prior to its entrance into secondary reaction chamber 51.

Unvaporized residual oil from secondary reaction chamber 51 may be withdrawn through a line 92, controlled by a valve 93, and passed to storage or elsewhere. A portion of raw oil from pump 3 may be passed through line 13, and thence through valve 98, interposed in said line, and introduced into a line 94, controlled by a valve 95, to blend in line 92 with the residual products being withdrawn from secondary reaction chamber 51. Similarly, any desired portion of the secondary charging stock from pump 81 may be passed through line 82, valve 83, line 96, valve 97, line 94, and valve 95, into line 92 to commingle with said residual products.

Pressures employed in both the primary and secondary cracking elements of the system may range from sub-atmospheric to superatmospheric pressures as high as 2000 pounds per square inch or more. Substantially equalized pressures may be employed throughout the entire process, or differential pressures may be employed between various elements thereof. Preferably, milder conversion conditions may be employed in the primary heating element than in the secondary heating element. Conversion temperatures employed may range from 750° F., to 1200° F., more or less.

As a specific example of one operation of the process, and the results obtainable thereby, a primary charging stock having approximately a 22° A. P. I. gravity, and representing approximately 75% of the total charge, and a secondary charging stock, amounting to about 25% of the total charge, being the pressure distillate bottoms from a redistillation of cracked distillate, and somewhat similar in characteristics to reflux condensate from the secondary fractionator of the primary cracking system, is subjected to treatment at a temperature of about 910° F., and a pressure of about 200 pounds per square inch in a primary heating element. This pressure is substantially equalized in the primary reaction chamber and primary fractionator. A temperature of about 1050° F., and a pressure of about 100 pounds per square inch is maintained in a secondary heating element, and this temperature is reduced by the introduction of a portion of the secondary charging stock at substantially the point of outlet of said secondary heating element, to a temperature of about 925° F. The secondary reaction chamber, fractionator, and secondary condensing and collecting equipment may be maintained under a substantially equalized pressure of about 30 pounds per square inch. The secondary fractionator and succeeding condensing and collecting equipment of the primary system may be maintained under a pressure of about 60 pounds per square inch, and a non-residuum operation is employed in the primary system.

As a result, a yield, based on the total raw oil supplied to the process, of approximately 63% of motor fuel, having an antiknock quality substantially equivalent to a blend of 50% benzol and 50% Pennsylvania straight-run Pennsylvania gasoline may be obtained. About 14% of residual oil, suitable for sale as fuel, and about 55 pounds of coke per barrel of oil charged may also be obtained; the only other product produced may be a gas of high calorific value.

I claim as my invention:

1. A conversion process which comprises subjecting hydrocarbon oil to cracking conditions of temperature and pressure in a primary zone, simultaneously cracking a lighter oil at higher temperature in a secondary cracking zone, subjecting the vapors evolved in said zones to independent primary fractionation in separate fractionating zones and supplying reflux condensate thus formed in said separate fractionating zones to said primary zone, then combining the separately fractionated vapors and subjecting the same to common secondary fractionation, supplying resultant secondary reflux condensate to said secondary cracking zone, and finally condensing the vapors uncondensed by said common secondary fractionation.

2. The process as defined in claim 1 further characterized in that the vapors evolved in said secondary cracking zone, prior to the primary fractionation thereof, are passed in indirect heat exchange with said secondary reflux condensate to reboil the latter before introduction of said secondary reflux condensate to the secondary cracking zone.

3. A conversion process which comprises subjecting hydrocarbon oil to cracking conditions of temperature and pressure in a primary zone, simultaneously cracking a lighter oil at higher temperature and under lower pressure in a secondary cracking zone, subjecting the vapors evolved in said zones to independent primary fractionation in separate fractionating zones, the vapors from the primary zone being fractionated under higher pressure than the vapors from the secondary cracking zone, supplying reflux condensate thus formed in said separate fractionating zones to said primary zone, then combining the separately fractionated vapors and subjecting the same to common secondary fractionation, supplying resultant secondary reflux condensate to said secondary cracking zone, and finally condensing the vapors uncondensed by said common secondary fractionation.

4. The process as defined in claim 3 further characterized in that the vapors evolved in said secondary cracking zone, prior to the primary fractionation thereof, are passed in indirect heat exchange with said secondary reflux condensate to reboil the latter before introduction of said secondary reflux condensate to the secondary cracking zone.

LYMAN C. HUFF.